United States Patent [19]
Leifeld et al.

[11] Patent Number: 5,623,749
[45] Date of Patent: Apr. 29, 1997

[54] APPARATUS FOR SEPARATING OPENED FIBER TUFTS FROM AN AIR STREAM

[75] Inventors: Ferdinand Leifeld, Kempen; Ralf Meger; Armin Leder, both of Mönchengladbach, all of Germany

[73] Assignee: Trützschler GmbH & Co. KG, Mönchengladbach, Germany

[21] Appl. No.: 535,839

[22] Filed: Sep. 28, 1995

[30] Foreign Application Priority Data

Nov. 10, 1994 [DE] Germany .......................... 44 36 114.9
Jun. 24, 1995 [DE] Germany .......................... 195 22 995.9

[51] Int. Cl.$^6$ .................................................. D01G 15/40
[52] U.S. Cl. ................................................ 19/105; 19/205
[58] Field of Search ........................ 19/105, 204, 97.5, 19/98, 145.7, 296, 303, 304, 205

[56] References Cited

U.S. PATENT DOCUMENTS

| 4,219,289 | 8/1980 | Trutzschler | 19/105 |
| 4,499,633 | 2/1985 | Trutzschler | 19/105 |
| 4,811,463 | 3/1989 | Leifeld | 19/105 |
| 5,150,502 | 9/1992 | Roberson | 19/105 |

FOREIGN PATENT DOCUMENTS

| 3128564 | 2/1983 | Germany . | |
| 3632905 | 4/1988 | Germany . | |
| 1432102 | 10/1988 | U.S.S.R. | 19/105 |
| 1133883 | 11/1968 | United Kingdom . | |
| 1530253 | 10/1978 | United Kingdom . | |
| 2064606 | 6/1981 | United Kingdom . | |
| 2100304 | 12/1982 | United Kingdom . | |
| 2099869 | 12/1982 | United Kingdom . | |
| 2172619 | 9/1986 | United Kingdom . | |
| 2236335 | 4/1991 | United Kingdom . | |

*Primary Examiner*—Michael A. Neas
*Attorney, Agent, or Firm*—Spencer & Frank

[57] ABSTRACT

An apparatus for feeding fiber tufts to a fiber processing textile machine includes a feed chute having upper and lower ends; a densifying air stream generating arrangement for introducing an air stream into the feed chute to densify the fiber tufts therein; a screen forming part of a lower region of the feed chute for separating the air stream from the fiber tufts; an air removal hood immediately adjoining the screen externally of the feed chute; and an arrangement for forcing the air stream through the screen openings out of the feed chute into and through the air removal hood.

18 Claims, 7 Drawing Sheets

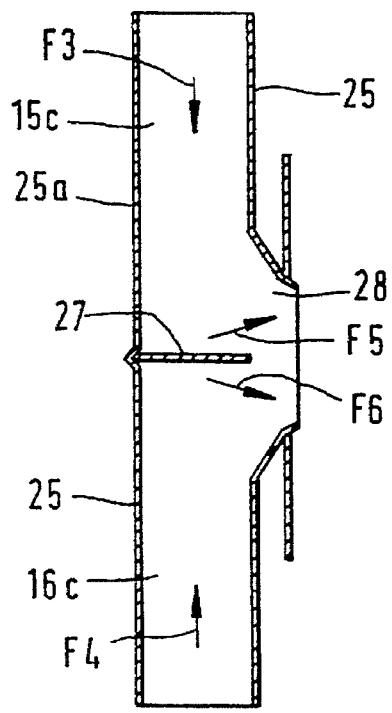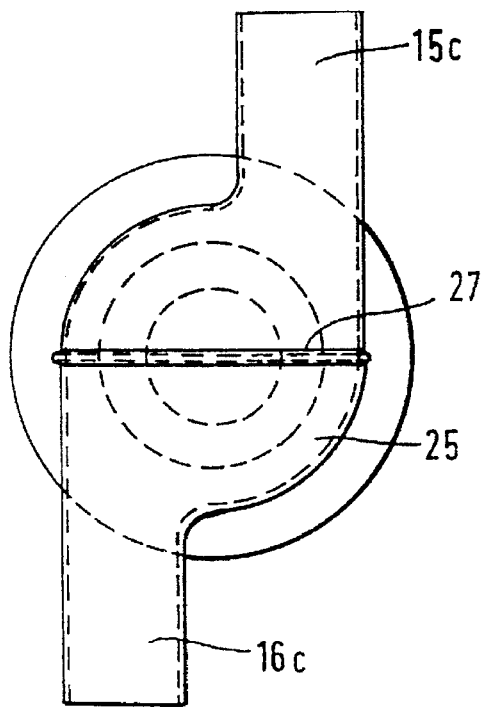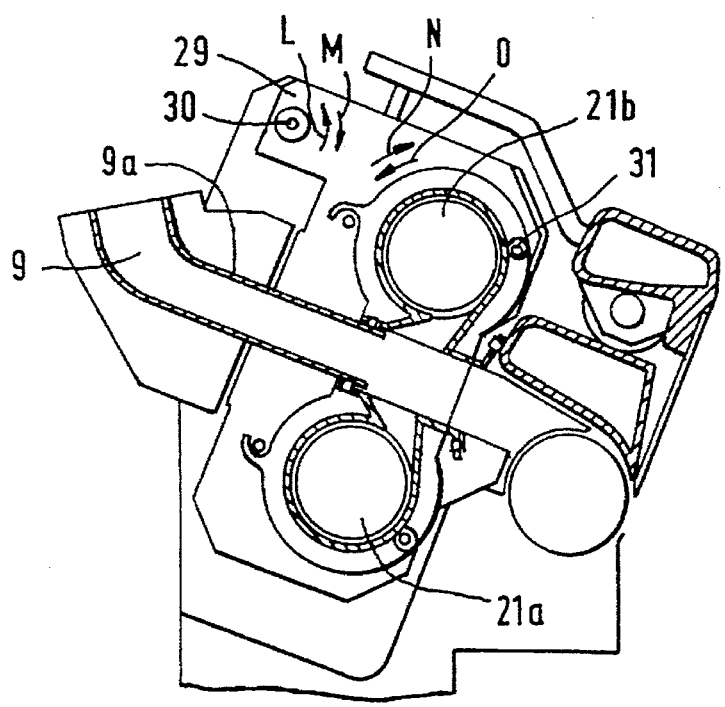

APPARATUS FOR SEPARATING OPENED FIBER TUFTS FROM AN AIR STREAM

CROSS REFERENCE TO RELATED APPLICATION

This application claims the priority of German Application Nos. P 44 36 114.9 filed Oct. 10, 1994 and 195 22 995.9 filed Jun. 24, 1995.

BACKGROUND OF THE INVENTION

This invention relates to an apparatus for separating opened fiber tufts from an air stream for the purpose of, for example, supplying the fiber tufts to a fiber processing machine such as a carding machine, a cleaner or the like. The apparatus has a feed chute communicating with a fiber tuft transporting duct from which the feed chute is charged with the fiber tufts. At the lower end of the feed chute a delivery device is arranged which withdraws the fiber tufts from the feed chute and discharges them in the form of a fiber lap. There is further provided an air-pervious partition (screen) for separating the fiber tufts from the air stream and for guiding the air stream out of the feed chute. The screen is adjoined externally of the feed chute by an air removal chamber which has an air inlet opening through which the air stream enters the air removal chamber and further, the air removal chamber is adjoined by an air removal conduit.

German Offenlegungsschrift (application published without examination) 35 04 607 discloses a fiber tuft feeder for a card. The feeder has an upper chute (reserve chute) and a lower chute (feed chute) adjoining the upper chute. The feed chute has an upper, open inlet end and a lower, open outlet end. At the inlet end of the feed chute a fiber tuft advancing device is arranged which includes a feed roller and an opening roller. Underneath the outlet end of the feed chute two delivery rollers are situated which withdraw the fiber tufts from the feed chute and advance them, as a fiber lap, to the fiber processing (carding) machine. Further, air guiding elements are provided which form a closed air circulation system and which serve for maintaining an air stream in the feed chute, oriented in the direction of the outlet end thereof. The air guiding elements include air outlet openings (constituting a screen) which are arranged in the feed chute between the inlet and the outlet ends in the chute wall. An air duct positioned externally of the feed chute has a first open end oriented towards air removal chambers adjoining the screen or screens and a second open end oriented towards the inlet end of the feed chute. In the duct a fan is positioned to drive air in a closed path into the inlet end of the feed chute, out of the feed chute through the air outlet openings and through the air removal chambers into the air duct. Above the reserve chute a fiber tuft transporting conduit is arranged for the pneumatic transport of the fiber tuft from an upstream-arranged fine opener to serve the reserve chutes of a plurality of tuft feeders. Inside the air duct between the fan and the inlet end of the feed chute an air distributing device is arranged for uniformly distributing air over the duct width. In the lower region of the feed chute two comb-shaped screens are arranged which function as separating walls. The vertical tines of the screens are spaced from one another by vertical slots which have a width of approximately 2.5–5 mm. Such a width is less than the expected minimum size of the fiber tufts to be separated from the air stream. Each screen is adjoined by a box-like air removal chamber which has a rectangular cross-sectional outline and which, over its width, has an air inlet opening which is oriented towards a planar wall of the chamber at a distance therefrom. The bottom and ceiling walls of the chamber are also planar. The air exits from the feed chute perpendicularly to the screens and enters the respective air removal chambers. At one of their front faces the box-like air removal chambers are connected with one another by a coupling channel extending externally of the lateral wall of the feed chute. The air removal duct communicates with the chambers at those front faces.

It is a disadvantage of the air removal chamber of conventional construction that it has corners in the flow path and a relatively large cross-sectional area. As a result, the flow velocity in the chamber is relatively small so that in the corners heavy parts (trash) may be deposited which capture fibers and may lead to obstructions. It is a further drawback that at low air speeds sticky substances usually present in cotton may adhere to the inner chamber walls. It is also a drawback that the large cross-sectional inner chamber area causes a pressure loss which leads to the requirement of a high energy input for the air removal. It is also a disadvantage that the corners of the box-like chamber may cause air turbulences which adversely affect an aerodynamically favorable removal of the air. Also, the box-like air removal chambers require a substantial technical and constructional outlay.

SUMMARY OF THE INVENTION

It is an object of the invention to provide an improved apparatus of the above-outlined type from which the discussed disadvantages are eliminated and which, in particular, permits an improved removal of the air stream separated from the fiber tufts and prevents operational disturbances caused by deposits or the like in the air guiding elements.

This object and others to become apparent as the specification progresses, are accomplished by the invention, according to which, briefly stated, the apparatus for feeding fiber tufts to a fiber processing textile machine includes a feed chute having upper and lower ends; a densifying air stream generating arrangement for introducing an air stream into the feed chute to densify the fiber tufts therein; a screen forming part of a lower region of the feed chute for separating the air stream from the fiber tufts; an air removal hood immediately adjoining the screen externally of the feed chute; and an arrangement for forcing the air stream through the screen openings out of the feed chute into and through the air removal hood.

By connecting the air removal chamber to the separating wall (screen) immediately downstream thereof (as viewed in the direction of air flow through the screen openings) and by providing a high air speed in the air removal chamber, a significantly improved removal of the air separated from the fiber tufts is obtained. The high flow speed prevents deposits of heavy particles (trash) so that no undesired fiber accumulations may appear and thus obstructions cannot occur. The continuously rapid air flow through fibers and particles along all inner surfaces further has a cleaning and lubricating effect which, in a particularly advantageous manner, prevents sticky substances present in cotton from adhering to the inner walls. In this way, the highly undesirable adherence of fiber accumulations is avoided and, at the same time, the maintenance outlay is substantially reduced. It is a further advantage of the invention that the apparatus is structurally simple which contributes to a disturbance-free operation. Also, only small pressure losses occur, as a result of which the energy input for generating the transporting air stream may be significantly reduced as compared to prior art constructions.

The invention further has the following additional advantageous features:

The air stream flows at a high speed between the screen and the intake side of a fan.

The cross section of the air removal chamber (air removal hood) and the air removal conduit are small.

The air removal hood which may be a suction hood, has at least partially an arcuate inner surface.

The inner surfaces of the air removal hood which define the flow path for the air stream is void of corners or sharp breaks.

The air stream enters the air removal hood approximately tangentially to its inner surface which has a circular cross-sectional area.

The flow passage cross section of the air removal hood and the cross-sectional area of the after-connected air removal ducts, have at least approximately the same dimensions.

The air removal is effected through both longitudinal ends of the hood.

The air removal is effected by virtue of a greater-than-atmospheric pressure in the feed chute.

The air removal is effected by virtue of a suction source, such as a fan or a climate control device, connected to the hood downstream thereof.

The air removal is effected by a pressure in the feed chute and by vacuum applied to the hood.

The air stream introduced into the feed chute and the vacuum in the hood are generated by one and the same fan, and the air flows in a closed circuit.

The conduit between the fan and the hood is short with as few bends as possible.

In the suction zone of the system no significant cross-sectional expansions are present.

The flow velocity in the suction system is approximately uniform.

The flow velocity in the entire suction zone (from the entrance of air into the hood to the suction source) is greater than 4 m/sec, preferably between 6 to 20 m/sec.

The hood is connected in an airtight manner with the air outlet opening of the feed chute.

The hood is pivotal to gain access thereto for cleaning purposes.

The separation for the pivotal motion at both ends of the suction hood is in the transition zone to the suction pipe or suction hose.

During pivotal motion of the hood, the air conduits remain attached thereto, that is, no separation takes place.

Flexible hoses are used; in this manner, the hoses may remain connected by virtue of their flexibility.

The pressure side of the fan is immediately connected to a device introducing an air stream into the upper (inlet) end of the feed chute.

The hood is made of an extruded aluminum member.

The hood is made of a transparent material, such as glass or a transparent plastic.

The hood is used for supplying fiber tufts to a carding machine.

The hood is used for supplying fiber tufts in an upper chute (reserve chute) of a two-chute fiber tuft feeder.

The hood is used in feeders for fiber cleaners.

The hood is used in feeders for fiber tuft openers.

The inlet opening of the air removal hood is associated at its edge with two oppositely located obliquely extending air guiding baffles.

The air enters the air removal hood at an acute angle to its flow direction in the feed chute.

The air stream propagates in a helical course axially in the inner space of the air removal hood.

BRIEF DESCRIPTION OF THE DRAWING

FIGS. 6a and 6b are sectional side and front elevational views, respectively, of an air collecting chamber forming part of the invention.

FIG. 7 is a side elevational view of a pivotal support box accommodating a pivotal air removal hood according to a preferred embodiment of the invention.

DESCRIPTION OF THE PREFERRED EMBODIMENTS

Figure 1:
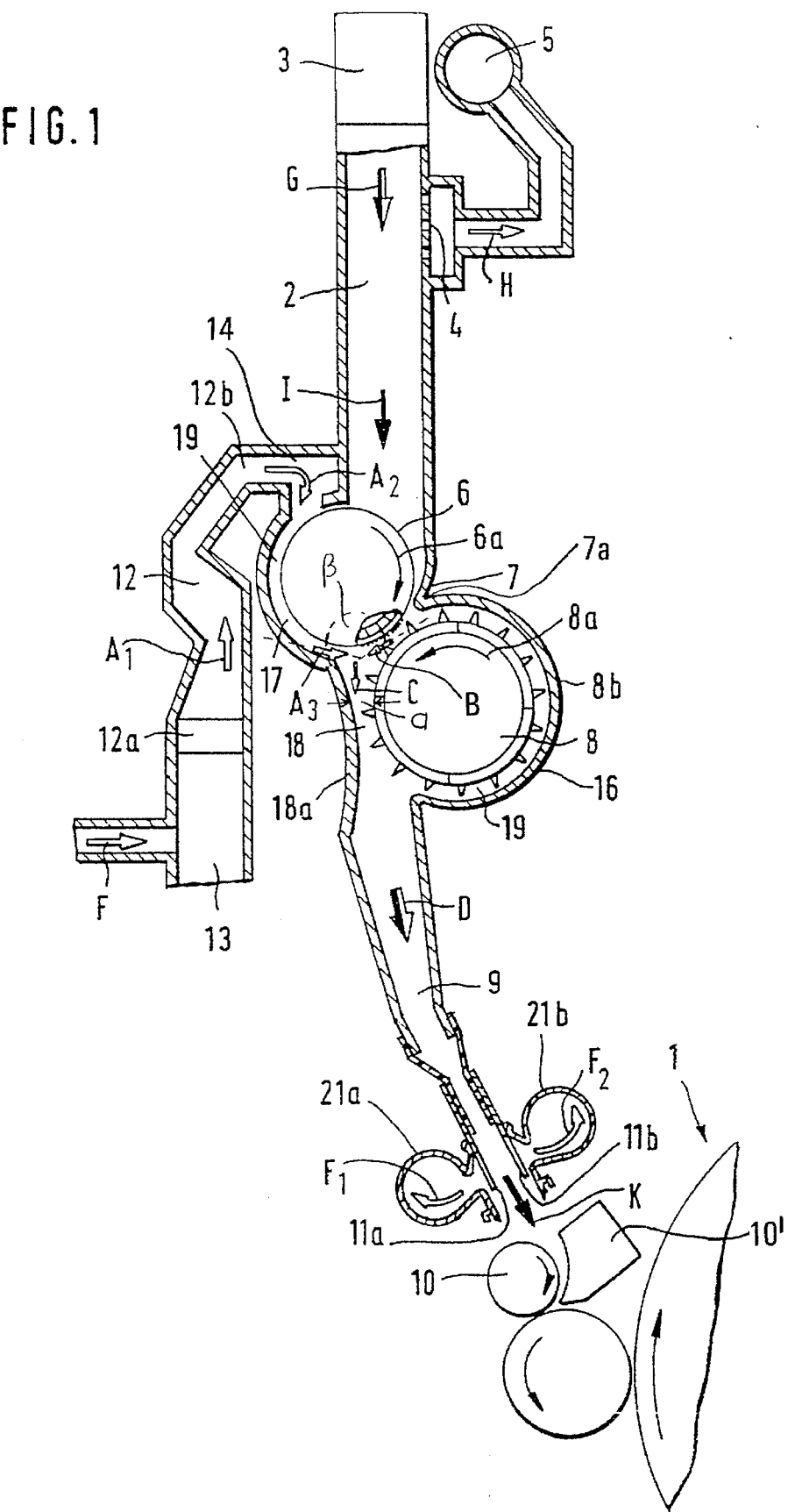
FIG. 1 is a schematic side elevational view of a fiber tuft feeder incorporating a preferred embodiment of the invention.

Turning to FIG. 1, at the fiber intake end of a carding machine 1 which may be, for example, an EXACTACARD DK model manufactured by Trützschler GmbH & Co. KG, Mönchengladbach, Germany, a vertical reserve chute 2 is provided which is charged with finely opened fiber material from the top. Such charging may be effected, for example, by a condenser through a supply and distributing conduit system 3. In the upper zone of the reserve chute 2 air outlet openings 4 are provided for separating the fiber tufts from the fiber-laden transporting air stream G which, as a substantially fiberless air stream H, passes through the air outlet openings 4 and enters into a suction device 5.

The lower end of the reserve chute 2 is obturated by a feed roller 6 which cooperates with a feed tray 7. The feed roller 6 draws fiber material from the reserve chute 2 and advances it to an underlying, rapidly rotating opening roller 8 which has pins 8b or a sawtooth clothing on its surface and which, with a lower part of its circumference, faces a lower or feed chute 9. The opening roller 8 which rotates in the direction of the arrow 8a delivers the fiber material into the feed chute 9. The feed chute 9 has at its lower end a delivery roller 10 which, in cooperation with a stationary feed member 10', presents fiber material to the carding machine 1. A fiber tuft feeder having the above-described features may be, for example, an EXACTAFEED FBK model manufactured by Trützschler GmbH & Co. KG. The feed roller 6 is driven slowly clockwise as indicated by the arrow 6a whereas the opening roller 8 rotates rapidly in the counterclockwise direction as indicated by the arrow 8b so that the mutually cooperating surface portions which define a clearance between the two rollers 6 and 8 move in the same circumferential direction.

Figure 1A:
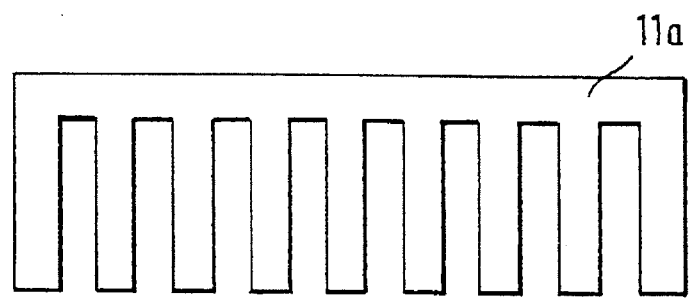
FIG. 1a is an enlarged end elevational view of a component of the FIG. 1 structure.

The feed chute 9 has a generally rectangular cross section and has opposite wide walls and opposite narrow walls oriented perpendicularly to the wide walls. The wide walls extend parallel to the axes of the rollers 6 and 8 and determine the horizontal width dimension of the feed chute. The horizontal width dimension of the narrow walls, in turn, determine the depth of the feed chute 9. The wide walls, in the lower zone of the feed chute 9 form oppositely located, identically structured comb-like screens 11a and 11b (FIG. 1a). Each screen 11a, 11b has a series of parallel tines separated by slots. At its top the feed chute 9 is in communication with a chamber 12, one end 12a of which adjoins the outlet end (pressure side) of a fan 13. By virtue of the rotating feed roller 6 and the opening roller 8, fiber material is introduced into the feed chute 9 at a certain flow rate. The fiber material is discharged from the feed chute 9 and advanced to the carding machine 1 by the delivery roller 10 at the same flow rate.

In order to uniformly densify (compress) the fiber tufts in the chute 9 and to maintain the fiber quantity constant therein, the fiber material in the feed chute 9 is exposed to a densifying, through-flowing air stream driven by the fan 13 through the chamber 12, a constriction 14 (wide slotted nozzle) at the outlet end 12b of the chamber 12 into the upper inlet of the feed chute 9. This air flow is aided by the suction side of the fan 13 which draws air streams through the oppositely located respective screens 11a and 11b, as will be described in greater detail later. Each air outlet screen 11a, 11b is adjoined by an air removal chamber (suction hood) 21a, 21b. Each hood 21a and 21b, as may be observed in FIGS. 2, 3, 4 and 5, has an elongated, generally cylindrical shape and extends horizontally such that the hood length is substantially coextensive with the width of the feed chute 9. Each hood 21a, 21b is, at opposite longitudinal ends thereof, coupled to the intake side of the fan 13 by conduits 15a–c and 16a–c as well as an air collecting chamber 25.

Figure 1B:
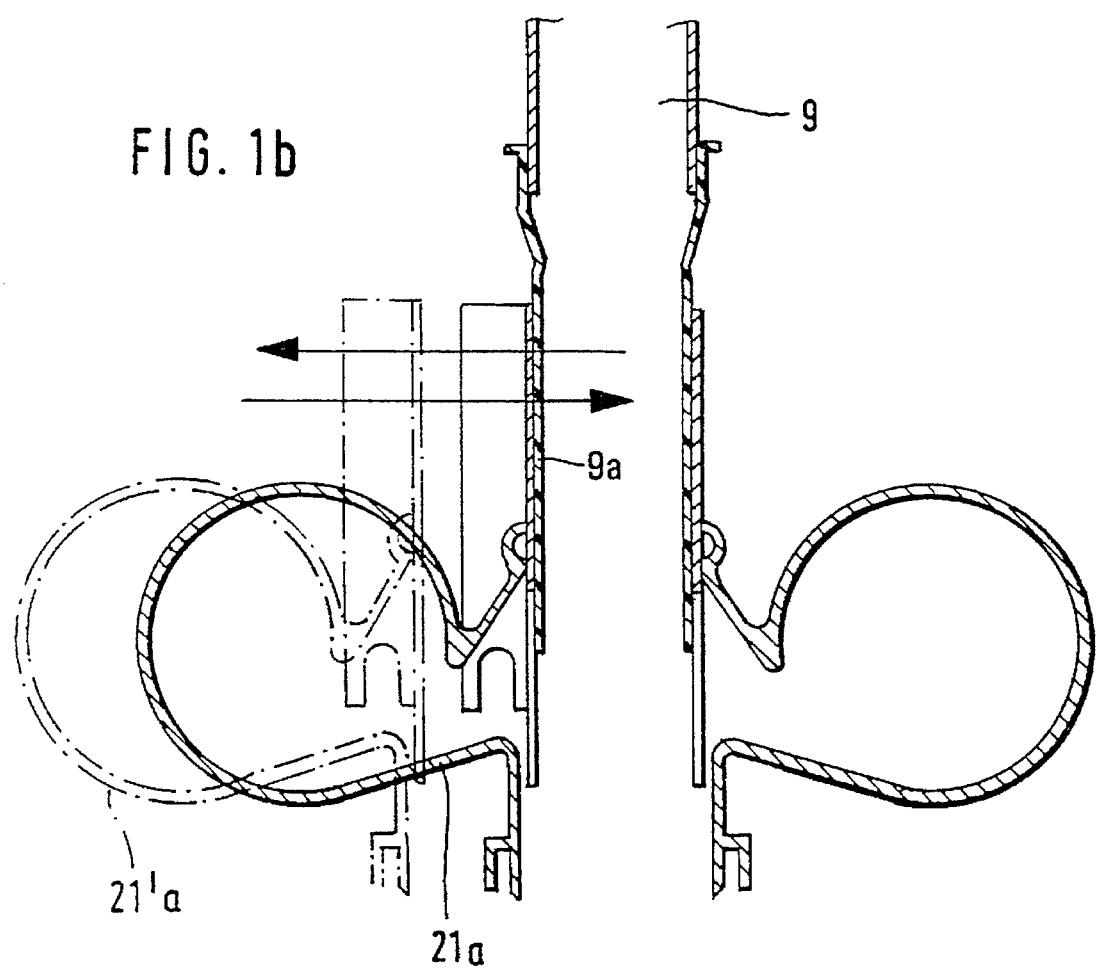
FIG. 1b is a schematic side elevational detail of FIG. 1.

The opening roller 8 is surrounded by a housing wall 16 and the feed roller 6 is surrounded by a housing wall 17 which are arcuate and are adapted to the curvature of the respective rollers 6 and 8. Viewed in the direction of rotation 8a of the opening roller 8, the housing 16 is interrupted by a channel-like separating aperture 18 into which fiber material is thrown by the opening roller 8. The housing wall 16 and the opening roller 8, as well as the housing wall 17 and the feed roller 6 define a channel 19. At the lower end of the reserve chute 2 the feed tray 7 is formed, whose edge 7a is oriented in the rotary direction 8a of the opening roller 8. An imaginary plane which contains the rotary axes of the feed roller 6 and the opening roller 8 is oriented at an angle α, for example, of 35° relative to the vertical plane containing the rotary axis of the opening roller 8 and is inclined in the rotary direction of the opening roller 8. The channels 19 and 18 as well as the feed chute 9 are arranged end-to-end and form a continuous passage. The wall 9a of the feed chute 9 may be adjusted in the width direction as shown in FIG. 1b.

The densifying air stream $A_1$ exits the pressure side of the fan 13, passes through the chamber 12 and the conduit 12b into the wide-slotted nozzle 14 and emerges therefrom as an air stream $A_2$. Thereafter the densifying air stream, as indicated by the arrows $A_3$, passes through the channel 19 on that side of the feed roller 6 and the opening roller 8 where the feed chute 9 starts. The densifying air stream $A_3$ is oriented against the direction of rotation 6a of the feed roller 6 and as a result, blows off the fiber tufts which still adhere to the feed roller 6. The rapidly rotating opening roller 8 entrains an air stream B. The densifying air stream $A_3$ flows in the direction of the opening roller 8 and combines with the air stream B under an obtuse angle β. Thereafter the two air streams are combined into a single air stream C which flows in the rotary direction 8a of the opening roller 8 in the channel 18 having a constriction a. During this occurrence the combined air stream C is aligned in itself and in the direction of the upper opening of the feed chute 9, and flows from the opening roller 8 in a slight deflection into the opposite direction as an air stream D into the feed chute 9, while carrying the fiber tufts thrown by the opening roller 8. By virtue of the fact that the channel 18 is flaring outwardly in the direction of the feed chute 9 from the constriction a, the fiber tuft-laden air stream D may expand downwardly of the opening roller 8. Thus, the stream D is not entrained by the opening roller 8 into a circumferential path but enters the channel 19 in the direction of rotation 8a of the opening roller 8 only as a branched, lesser residual air stream.

The opening roller 8 delivers the fiber tufts into the air streams C and D. The channel 18 extends essentially over the lateral zone of the opening roller 8 so that the air streams A, C and D serving for densifying the fiber material in the feed chute 9 exert their effect along the opening roller 8. In this manner, the separation of the fiber tufts from the needles 8b of the opening roller 8 effected by centrifugal forces is pneumatically enhanced.

Figure 2:
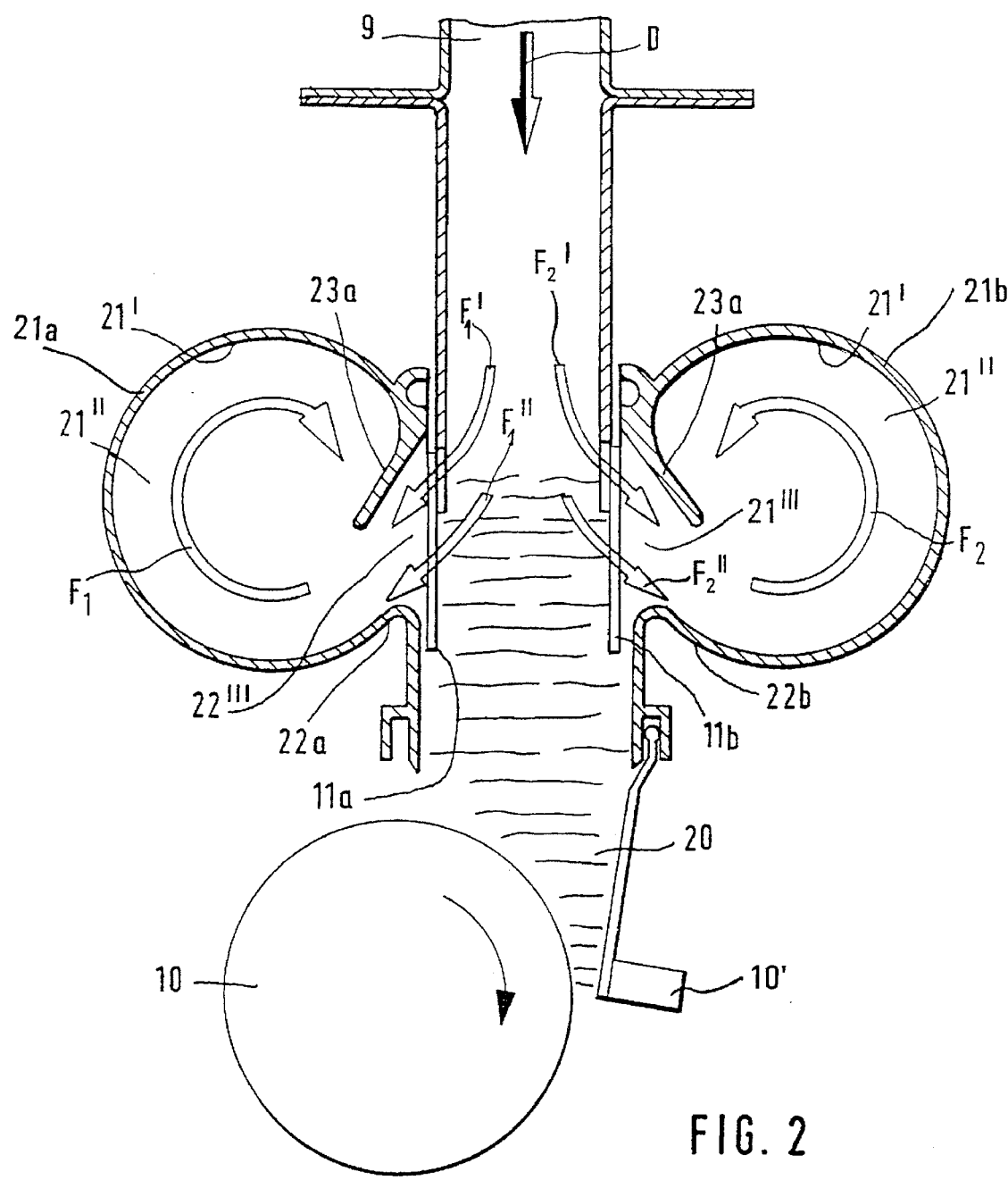
FIG. 2 is an enlarged schematic side elevational view of the components illustrated in FIG. 1b, showing further details.

In FIG. 2 the lower region of the feed chute 9 is illustrated, together with the fiber tuft discharging device that comprises the delivery roller 10 and the feed tray 10' which, in cooperation with one another, advance the fiber material as a fiber lap out of the feed chute 9.

Partial streams $F_1'$ and $F_2'$ deviate above the upper level of the fiber fill 20 and enter under an acute angle through the slots of the screens 11a, 11b into an inner space 21" of the oppositely located respective suction hoods 21a and 21b. During this occurrence the air streams $F_1'$ and $F_2'$ flow along respective air guide baffles 23a which, on one side border the air inlets 21''' of the two suction hoods 21a and 21b. The remaining part of the fiber tuft-laden air stream D enters the fiber material 20 from above then changes direction and enters through the screens 11a, 11b into the inner chambers 21" of the respective suction hoods 21a and 21b as partial air streams $F_1''$ and $F_2''$. The air streams $F_1''$ and $F_2''$ propagate approximately tangentially along a curved wall portion 22a, 22b of the respective suction hoods 21a, 21b which border on the other side of the respective inlet 21''' of the suction hoods 21a, 21b. Thereafter the air streams $F_1'$, $F_1''$ and the air streams $F_2'$, $F_2''$ are united to form a respective air stream $F_1$ and $F_2$ which, corresponding to the curvature of the inner surface 21' of the two suction hoods 21a, 21b, assumes an arcuate course. At the same time, the vacuum stream generated by the fan 13 flows in the axial direction of the suction hoods 21a and 21b so that the air streams $F_1$ and $F_2$ flow approximately helically through the elongated inner chamber 21" of the respective suction hoods 21a, 21b into the air removal conduits 15a and 15b each adjoining opposite ends of the respective suction hoods 21a, 21b as best shown in FIG. 4.

Figure 3:
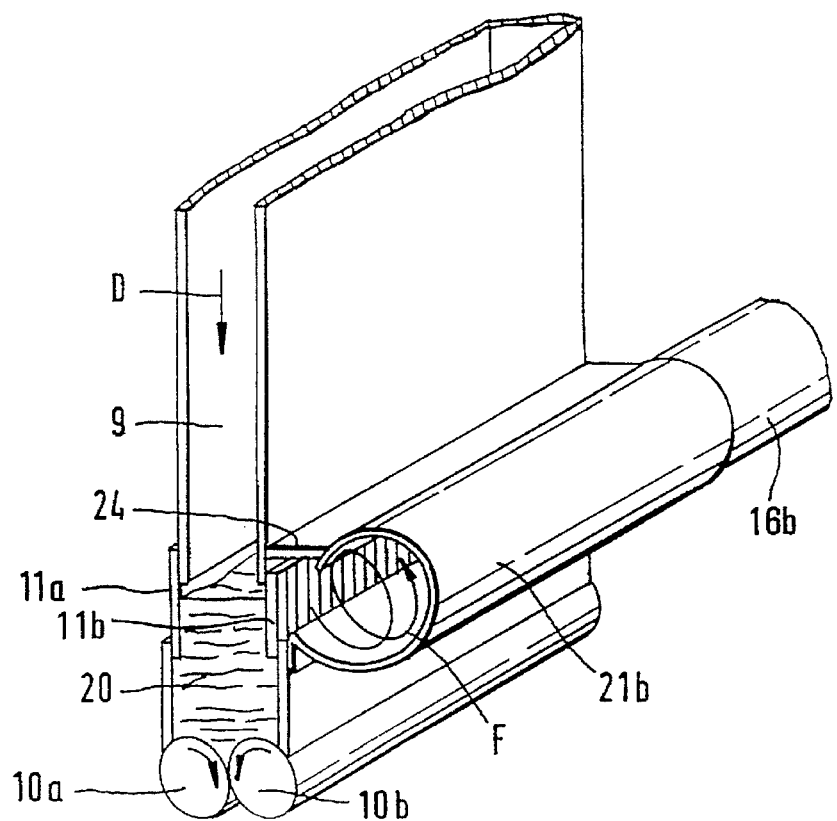
FIG. 3 is a perspective view of the preferred embodiment of the invention.

The separating screens 11a, 11b form common wall portions of the feed chute 9 on the one hand and the respective suction hoods 21a, 21b on the other hand; that is, the suction hoods 21a, 21b directly adjoin the screens 11a, 11b. The air streams $F_1$ and $F_2$ flow through the inner space 21" of the respective hoods 21a and 21b with a relatively high speed without, however, generating turbulences. The cross section of the inner spaces 21″ of the respective suction hoods 21a, 21b is at least approximately of circular shape. The outflow of the air streams $F_1$ and $F_2$ in the axial direction of the respective suction hoods 21a, 21b forms an angle of 90° with the inflowing air streams $F_1'$, $F_1''$ and $F_2'$, $F_2''$. The suction hoods 21a, 21b are sealed airtight with respect to the feed chute 9. The suction hoods 21a, 21b are one-piece components made of an extruded aluminum profile. Such a seal may be a sealing gasket 24 made, for example, of rubber, as illustrated in FIG. 3.

Figure 4:
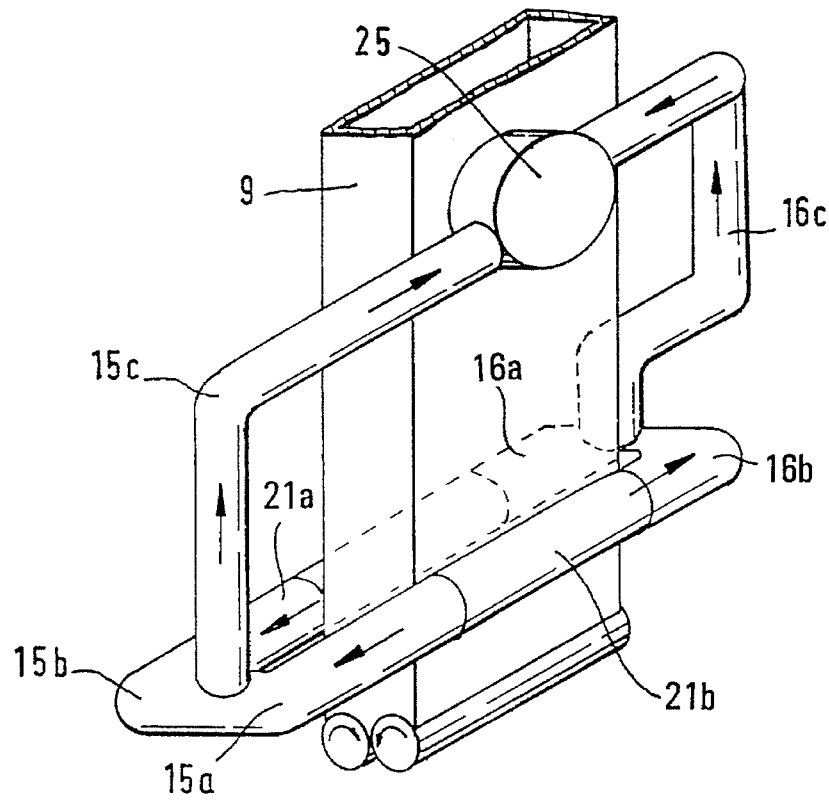
FIG. 4 is a perspective view of a closed air circulating system forming part of the invention.
Figure 5:
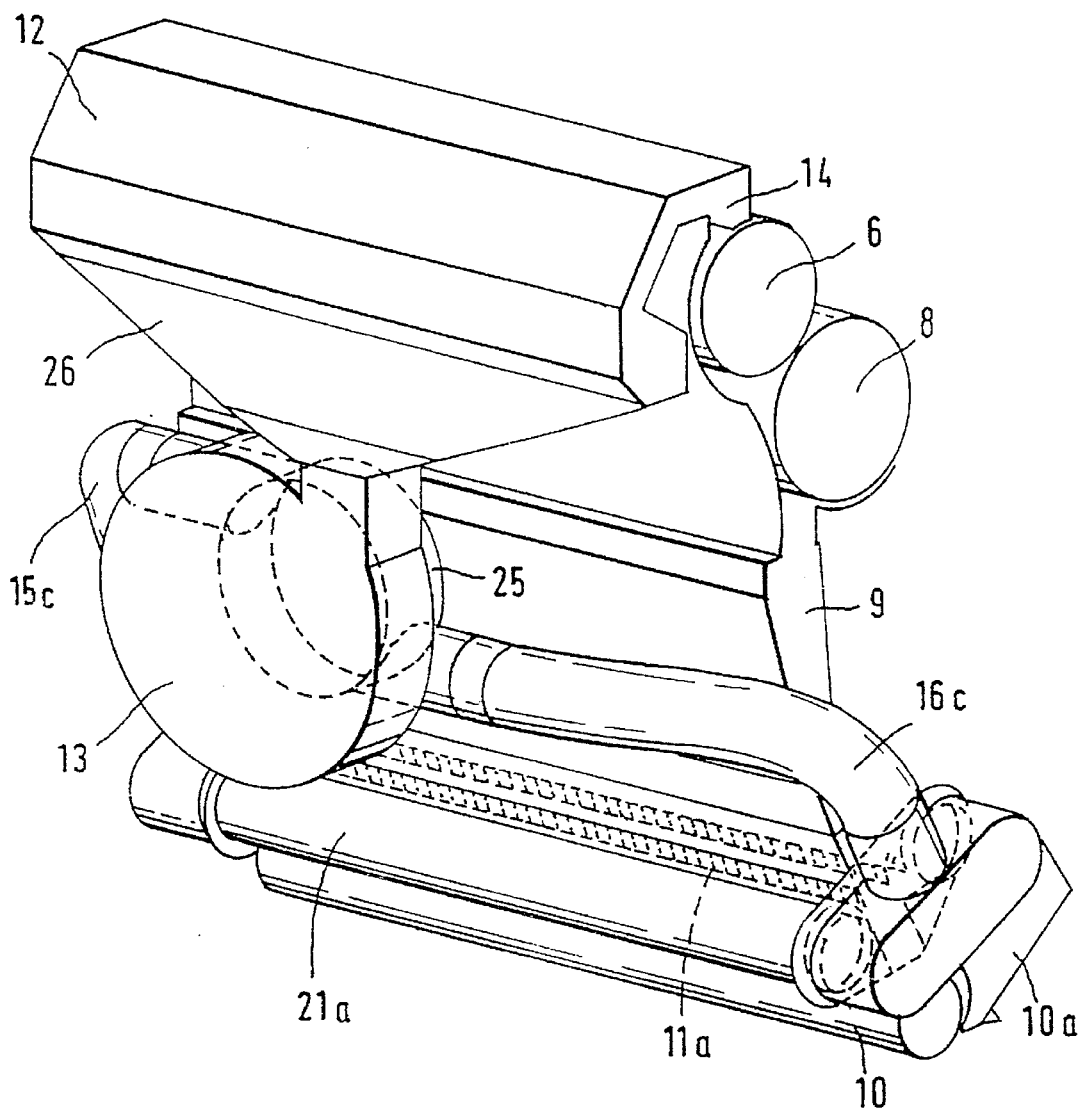
FIG. 5 is a perspective view of a variant of the closed air circulating system.

As shown in FIG. 4, the air removal ducts 15a and 16a join opposite ends of the suction hood 21a whereas the air removal conduits 15b and 16b extend from opposite ends of the suction hood 21b. The conduits 15a, 15b as well 16a and 16b are joined together and a respective further air removal duct 15c, 16c extends therefrom to enter an air chamber 25 which is joined by the inlet (suction side) of the fan 13, as shown in FIG. 5. The flow passage cross section of the suction hoods 21a, 21b and the conduits 15a–c and 16a–c is substantially the same.

The air streams designated with the letters A–F, as best seen when considering FIGS. 1–5 together, flow in a closed circuit. In recapitulation, the air stream exits from the pressure side of the fan 13, passes through the chamber 12 and the wide slotted nozzle 14 into the chamber 19, therefrom through the chamber 18 into the feed chute 9, then through the screens 11a, 11b into the suction hoods 21a, 21b and then through the air removal conduits 15a, 15b, 15c, 16a, 16b and 16c into the collecting chamber 25 and then into the intake side of the fan 13.

Between the pressure side of the fan 13 and the entrance of the chamber 12 a truncated pyramid-shaped guide element 26 is provided which widens in the flow direction and by means of which the air stream is distributed over the width of the feed chute 9.

It is noted in connection with FIGS. 1 and 2 that the arrows designated with letters A, B, C, F, H shown in outline indicate only air streams, the solid arrows I, K indicate only a fiber stream whereas the half-solid, half-outlined arrows D and G indicate fiber tuft-laden air streams.

The device according to the invention may find use in all types of feed chutes for fiber tufts where the air is to be separated from the fiber material. Such feed chutes are, in addition to card feeders, also used in fiber cleaning installations, for example, for feeding cleaning machines, opening machines or the like.

Turning to FIGS. 6a and 6b, in the air collecting chamber 25 a planar baffle plate 27 is positioned perpendicularly to the chamber wall 25a. In the wall 25b opposite the wall 25a an opening 28 is provided which leads to the intake side of the fan 13. The air streams $F_3$ and $F_4$ arrive from the air conduits 15c and 16c and from opposite sides impinge, approximately with a perpendicular incidence, on the baffle plate 27, as a result of which they are decelerated and are deflected towards the intake of the fan 13 into which the they enter through the opening 28 as air streams $F_5$ and $F_6$.

As shown in FIG. 7, a support box 29 is provided which is pivotal in the direction of arrows L and M about a fixed pivot 30. The support box 29 in turn has a pivot arrangement 31 about which the suction hood 21b may swing relative to the support box 29 as indicated by the arrows N and O.

Figure 8A:
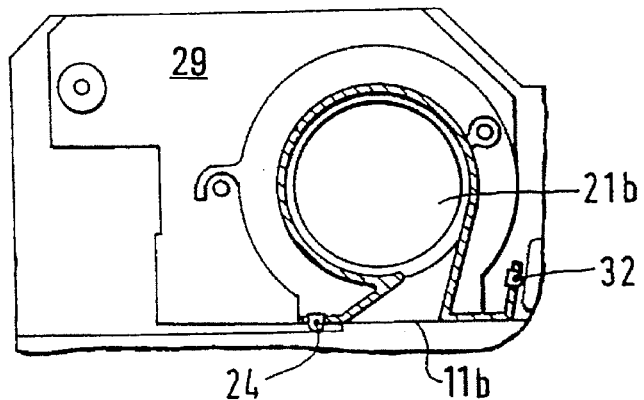
FIGS. 8a, 8b and 8c are schematic side elevational views of a pivotal support box of FIG. 7 shown in different operational positions.
Figure 8B:
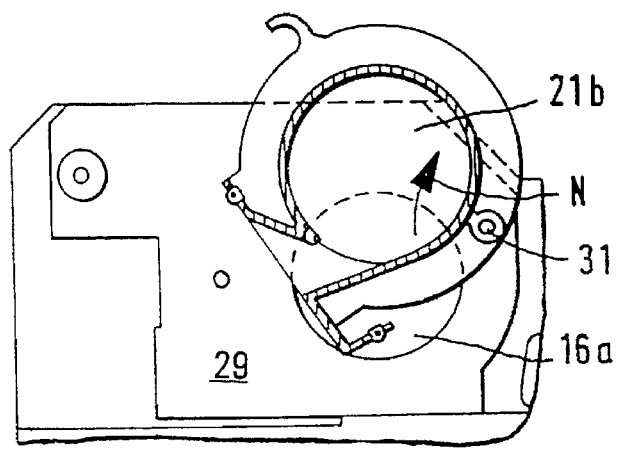
Figure 8C:
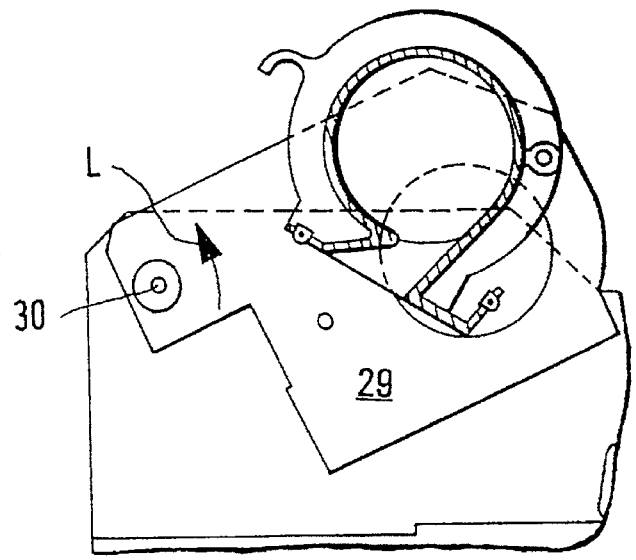

FIG. 8a illustrates the support box 29 in its closed position in which the associated screen 11b constitutes an aligned extension of the wall of the feed chute 9. According to FIG. 8b, the suction hood 21b is pivoted (after releasing a securing device) about the pivot 31 in the direction of the arrow N so that the inlet opening of the suction hood 21b is separated from the screen 11b. In accordance with FIG. 8c, the support box 29 (after releasing a securing device) is pivoted about the pivot 30 in the direction of the arrow L whereby the screen 11b is moved away from the chute wall. According to FIGS. 8b and 8c, the support box 29 and the suction hood 21b are consecutively and commonly pivoted. Rubber seals 24 and 32 are provided to prevent air leakages. The suction hood 21a on the opposite side of the feed chute 9 may be associated with a separate holding and pivoting structure similar to that described in connection with suction hood 21b.

It will be understood that the above description of the present invention is susceptible to various modifications, changes and adaptations, and the same are intended to be comprehended within the meaning and range of equivalents of the appended claims.

What is claimed is:

1. An apparatus for feeding fiber tufts to a fiber processing textile machine, the apparatus comprising
    (a) a feed chute having upper and lower ends;
    (b) means for introducing fiber tufts into the feed chute at said upper end;
    (c) means for discharging the fiber tufts from said feed chute at said lower end;
    (d) densifying air stream generating means for introducing an air stream into said feed chute in a flow direction toward said lower end to densify the fiber tufts therein;
    (e) a screen forming part of a lower region of said feed chute for separating the air stream from the fiber tufts; said screen having screen openings;
    (f) an air removal hood immediately adjoining said screen externally of said feed chute;
    (g) means for forcing the air stream through said screen openings out of said feed chute into and through said air removal hood;
    (h) first guide means for guiding the air stream into said air removal hood from said feed chute through said screen openings at an acute angle relative to said flow direction; and
    (i) second guide means for guiding the air stream in a curvilinear path within said air removal hood upon entry thereinto from said feed chute.

2. The apparatus as defined in claim 1, wherein said densifying air stream generating means comprises a fan having a pressure outlet and an air conduit assembly having an inlet directly connected to said pressure outlet and an outlet merging into said upper end of said feed chute.

3. The apparatus as defined in claim 1, wherein said screen comprises a plurality of generally parallel-extending tines separated from one another by slender clearances through which air passes from said feed chute into said air removal hood.

4. The apparatus as defined in claim 1, wherein said air removal hood has an arcuate inner surface.

5. The apparatus as defined in claim 4, wherein said air removal hood has a cross-sectionally circular shape.

6. The apparatus as defined in claim 1, wherein said densifying air stream generating means includes a suction source and a pressure source; said suction source and said pressure source being constituted by a common fan having an intake side comprised in said suction source and an outlet side comprised in said pressure source; further comprising conduit means for providing a closed air stream path between said outlet and inlet sides of said fan through said feed chute, said screen and said air removal hood.

7. The apparatus as defined in claim 1, further comprising a holding device for carrying said screen and said air removal hood.

8. An apparatus for feeding fiber tufts to a fiber processing textile machine, the apparatus comprising
   (a) a feed chute having upper and lower ends;
   (b) means for introducing fiber tufts into the feed chute at said upper end;
   (c) means for discharging the fiber tufts from said feed chute at said lower end;
   (d) densifying air stream generating means for introducing an air stream into said feed chute to densify the fiber tufts therein;
   (e) a screen forming part of a lower region of said feed chute for separating the air stream from the fiber tufts; said screen having screen openings;
   (f) an air removal hood immediately adjoining said screen externally of said feed chute; said air removal hood having a normal operating or closed position and an externally accessible or open position;
   (g) means for pivoting said air removal hood into said closed and open positions; and
   (h) means for forcing the air stream through said screen openings out of said feed chute into and through said air removal hood.

9. An apparatus for feeding fiber tufts to a fiber processing textile machine, the apparatus comprising
   (a) a feed chute having upper and lower ends;
   (b) means for introducing fiber tufts into the feed chute at said upper end;
   (c) means for discharging the fiber tufts from said feed chute at said lower end;
   (d) densifying air stream generating means for introducing an air stream into said feed chute to densify the fiber tufts therein;
   (e) a screen forming part of a lower region of said feed chute for separating the air stream from the fiber tufts; said screen having screen openings;
   (f) an air removal hood immediately adjoining said screen externally of said feed chute; said air removal hood having an arcuate inner surface and a cross-sectionally circular shape; said screen extending generally tangentially to said air removal hood; and
   (g) means for forcing the air stream through said screen openings out of said feed chute into and through said air removal hood.

10. An apparatus for feeding fiber tufts to a fiber processing textile machine, the apparatus comprising
    (a) a feed chute having upper and lower ends;
    (b) means for introducing fiber tufts into the feed chute at said upper end;
    (c) means for discharging the fiber tufts from said feed chute at said lower end;
    (d) densifying air stream generating means for introducing an air stream into said feed chute to densify the fiber tufts therein;
    (e) a screen forming part of a lower region of said feed chute for separating the air stream from the fiber tufts; said screen having screen openings;
    (f) an air removal hood immediately adjoining said screen externally of said feed chute; said air removal hood having an arcuate inner surface and a cross-sectionally circular shape;
    (g) means for forcing the air stream through said screen openings out of said feed chute into and through said air removal hood; and
    (h) air guide members secured to said air removal hood at an inner surface thereof; said air guide members adjoining said screen and being oriented in a direction generally in a circumferential direction of said circular shape to effect a generally helical propagation of the air stream within said air removal hood along a length thereof.

11. An apparatus for feeding fiber tufts to a fiber processing textile machine, the apparatus comprising
    (a) a feed chute having upper and lower ends;
    (b) means for introducing fiber tufts into the feed chute at said upper end;
    (c) means for discharging the fiber tufts from said feed chute at said lower end;
    (d) densifying air stream generating means for introducing an air stream into said feed chute to densify the fiber tufts therein; said densifying air stream generating means including a suction source and a pressure source; said suction source and said pressure source being constituted by a common fan having an intake side comprised in said suction source and an outlet side comprised in said pressure source;
    (e) a screen forming part of a lower region of said feed chute for separating the air stream from the fiber tufts; said screen having screen openings;
    (f) an air removal hood immediately adjoining said screen externally of said feed chute;
    (g) means for forcing the air stream through said screen openings out of said feed chute into and through said air removal hood; and
    (h) conduit means for providing a closed air stream path between said outlet and inlet sides of said fan through said feed chute, said screen and said air removal hood; said conduit means comprising conduits connecting said air removal hood with said intake side of said fan; said air removal hood and said conduits having uniform and substantially identical cross-sectional flow passage areas.

12. An apparatus for feeding fiber tufts to a fiber processing textile machine, the apparatus comprising
    (a) a feed chute having upper and lower ends; said feed chute being formed of a feed chute wall having a horizontally measured width and a horizontally measured depth;
    (b) means for introducing fiber tufts into the feed chute at said upper end;
    (c) means for discharging the fiber tufts from said feed chute at said lower end;
    (d) densifying air stream generating means for introducing an air stream into said feed chute to densify the fiber tufts therein;
    (e) a screen forming part of a lower region of said feed chute for separating the air stream from the fiber tufts; said screen having screen openings; said screen having a vertically measured height and a horizontally measured length; said width of said feed chute wall being parallel to said length of said screen;
    (f) an air removal hood immediately adjoining said screen externally of said feed chute; said air removal hood having a length being parallel to the length of said screen; said air removal hood having an outlet at a longitudinal end thereof; and (g) means for forcing the air stream through said screen openings out of said feed chute into and through said air removal hood.

13. The apparatus as defined in claim 12, wherein said means for forcing the air stream includes a suction source coupled to said longitudinal end.

14. The apparatus as defined in claim 12, wherein said air removal hood has opposite longitudinal ends each having an outlet opening; wherein said densifying air stream generating means includes a suction source and a pressure source; said suction source and said pressure source being constituted by a common fan having an intake side comprised in said suction source and an outlet side comprised in said pressure source; further comprising conduit means for providing a closed air stream path between said outlet and intake sides of said fan through said feed chute, said screen and said air removal hood; said conduit means comprising an air collecting chamber situated immediately adjacent said intake side of said fan; said air collecting chamber having two chamber inlets and a chamber outlet; said conduit means further including first and second conduits attached to respective said outlet openings of said air removal hood and attached to respective said chamber inlets of said air collecting chamber for merging thereinto at generally opposite sides thereof relative to said chamber outlet; further comprising a baffle plate positioned in said air collecting chamber generally centered relative to said chamber outlet and facing said chamber inlets, whereby air entering said air collecting chamber through said chamber inlets impinges on said baffle plate and is directed by said baffle plate into said chamber outlet.

15. The apparatus as defined in claim 12, wherein said length of said screen and said air removal hood and the width of said feed chute wall are substantially coextensive.

16. An apparatus for feeding fiber tufts to a fiber processing textile machine, the apparatus comprising (a) a feed chute having upper and lower ends;

(b) means for introducing fiber tufts into the feed chute at said upper end;

(c) means for discharging the fiber tufts from said feed chute at said lower end;

(d) densifying air stream generating means for introducing an air stream into said feed chute to densify the fiber tufts therein;

(e) a screen forming part of a lower region of said feed chute for separating the air stream from the fiber tufts; said screen having screen openings;

(f) an air removal hood immediately adjoining said screen externally of said feed chute;

(g) means for forcing the air stream through said screen openings out of said feed chute into and through said air removal hood;

(h) a holding device for carrying said screen and said air removal hood; and (i) means for pivotally supporting said holding device.

17. The apparatus as defined in claim 1, wherein said air removal hood has a length extending along said screen in a direction transverse to said flow direction of the air stream in said chute; said screen extending generally tangentially to said air removal hood; said air removal hood having, when viewed in any section taken transversely to said length, a curved inner surface, whereby the air stream is guided in a curvilinear path within said air removal hood without impingement thereon upon entry thereinto from said feed chute; said curved inner surface forming said second guide means.

18. The apparatus as defined in claim 16, further comprising a pivotal support carried by said holding device; said air removal hood being secured to said pivotal support for pivotal motions of said air removal hood relative to said holding device.

* * * * *

UNITED STATES PATENT AND TRADEMARK OFFICE
CERTIFICATE OF CORRECTION

PATENT NO. : 5,623,749
DATED : April 29, 1997
INVENTOR(S) : Ferdinand Leifeld et al It is certified that error appears in the above-indentified patent and that said Letters Patent is hereby corrected as shown below:

On the title page, item [30], the date of the first foreign priority application should read --Oct. 10, 1994--.

Signed and Sealed this

Twenty-second Day of July, 1997

Attest:

BRUCE LEHMAN

Attesting Officer

Commissioner of Patents and Trademarks